Dec. 12, 1961    D. P. HEARN    3,013,156
APPARATUS FOR SUPPORTING GEIGER COUNTERS
Filed Jan. 22, 1958

INVENTOR.
DANIEL P. HEARN
BY Robert M. Sperry
AGENT

United States Patent Office 3,013,156
Patented Dec. 12, 1961

3,013,156
APPARATUS FOR SUPPORTING
GEIGER COUNTERS
Daniel P. Hearn, Tulsa, Okla., assignor, by mesne assignments, to Dresser Industries, Inc., Dallas, Tex., a corporation of Delaware
Filed Jan. 22, 1958, Ser. No. 710,444
4 Claims. (Cl. 250—83)

This invention relates to radioactivity well logging, and is particularly directed to novel methods and apparatus for supporting radiation detectors in subsurface instruments, and more especially Geiger counters for use with well perforators.

In the art of radioactivity well logging, a subsurface instrument containing a radiation detector, such as a Geiger counter, is suspended in a well or borehole on the end of a cable which contains at least one electrical conductor for transmitting signals from the instrument to a suitable recording device at the surface of the earth. The subsurface instrument contains suitable electronic equipment for deriving a signal from the detector, and processing the signal for transmission up the cable.

To make a log of a well, the subsurface instrument must traverse all or a large part of the borehole which may extend several miles below the surface of the earth. Moreover, for various reasons, the boreholes generally are not straight. Instead, they have numerous irregularities. Consequently, as the subsurface instrument is raised or lowered in the borehole, it frequently bangs against the wall of the well, and it will be apparent that the detector is repeatedly subjected to very extreme mechanical shock.

Further, it is common practice to line the borehole with steel casing. When this is done, it is often found that a formation of interest has been covered by the casing, and it is necessary to perforate the casing with bullets, shaped charges of explosives or other suitable means in order to produce oil, gas or the like from these formations. In order to be sure that the casing is perforated adjacent the desired formation, it is desirable to combine a radioactivity well logging instrument with a gun perforator. However, when this is done and the gun is fired, the instrument is subjected to momentary pressures which may be as great as 50,000 pounds per square inch. This hurls the instrument against the wall of the well with tremendous force and often causes the instrument to jump as much as twenty to thirty feet up the well in a fraction of a second, after which it falls back down the well as far as the cable will allow, and is then jerked to a stop and crashes about until the force of the shot is expended. In addition, it frequently happens that, when the gun is fired, a formation will be perforated which contains gas under extremely high pressures. When this gas is suddenly released by the perforation, it frequently has sufficient force to blow the perforating instrument several hundred feet up the well in the same manner that a bullet is pushed through a rifle barrel. It is not uncommon, in such cases, for the instrument to be blown completely out of the well and there have been occasions when perforating instruments were blown out of the well with such force that they were thrown higher than the top of the derrick. When this happens, the detector undergoes almost unbelievable mechanical shock. In conventional Geiger counter instruments, the counters are mounted by supporting the cathode rigidly from the instrument housing while the anode and associated connectors on the anode are supported from the cathode by ceramic insulators. Thus any mechanical shock accelerates the cathode while the anode and connectors, which have appreciable mass, tend to remain in place due to inertia. This results in considerable shearing and bending moments on the insulators. However, the ceramic insulators are quite brittle and less brittle insulators do not have the insulating and mechanical properties necessary to retain the counter gas filling and avoid leakage of current between anode and cathode. Moreover, due to the high voltages which must be applied to Geiger counters, it is customary to form the insulators with a plurality of circumferential grooves to extend the surface leakage path. This makes the insulators mechanically weak and, under the forces encountered in a combination radioactivity well logging instrument and well perforator, the insulators frequently break. This permits the counter gas filling to become contaminated and allows short circuiting to occur, making the counters inoperative. The other counter components are of metal and are generally able to withstand the shock.

Obviously, unless some steps are taken to protect these components against such shocks, the instrument will likely be destroyed by its first use. Heretofore, resilient bumpers or cushions of foam rubber or the like have been employed to protect the counters, as suggested by Patent No. 2,385,857, issued October 2, 1945 to Gerhard Herzog. However, this merely serves to damp the shock, and while this may be sufficient for some purposes, it is grossly inadequate for use in combination perforating and radioactivity well logging instruments, since it is impossible to provide sufficient cushioning in the limited space available. Accordingly, it has not been practical in the past to employ Geiger counters in combination perforating and radioactivity well logging instruments, since some or all of the Geiger counters in the instrument generally become disabled during each operation.

These disadvantages of prior art instruments are overcome with the present invention, and novel methods and apparatus for mounting Geiger counters are provided whereby the Geiger counters are completely protected against damage due to mechanical shock. Moreover, in some boreholes, temperatures of the order of 400 degrees Fahrenheit may be encountered and, since Geiger counters are somewhat temperature sensitive, the signal from the subsurface instrument may be misleading. The mounting of the present invention serves as thermal insulation in addition to preventing damage by mechanical shock.

These advantages of the present invention are preferably attained by encapsulating the Geiger counters in a relatively massive body of a rigid, thermally and electrically insulating material, such as an epoxy resin, which is cast or otherwise formed to fit intimately about the detector and to fill the space between the Geiger counters and the housing of the instrument. This "filler" provides support for the anode connector and the insulator, as well as the cathode, and distributes the effect of mechanical shock evenly over the entire counter. All parts of the counter are constrained by the filler to move together as a unit so that breakage of the counters is eliminated. Moreover, the counters are protected against temperature changes, and the electrical insulation is improved. In addition, in cases where counters of unusual shape are required, the filler considerably facilitates mounting and positioning of the counter.

Accordingly, it is an object of the present invention to provide novel methods and apparatus for mounting Geiger counters in radioactivity well logging instruments.

Another object of the present invention is to provide novel methods and apparatus for protecting Geiger counters against damage due to mechanical shock.

A specific object of the present invention is to provide a novel method for mounting a Geiger counter in a combination well perforator and radioactivity well logging instrument, said method comprising casting said Geiger counter in a body of rigid, thermally and electrically insulating material which fills the space between said Geiger counter and the housing of said instrument.

Another specific object of the present invention is to provide novel means for mounting a Geiger counter in a combination well perforator and radioactivity well logging instrument, said means comprising a body of rigid, thermally and electrically insulating material formed about said Geiger counter and filling the space between said Geiger counter and the housing of said instrument.

These and other objects and features of the present invention will be apparent from the following description wherein reference is made to the figures of the accompanying drawing.

Figure 1:
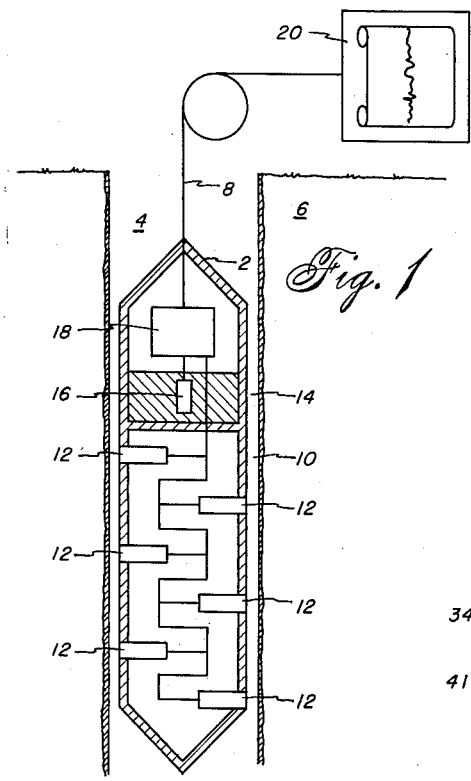
FIG. 1 is a view, partly in section, showing a typical combination gun perforator and radioactivity well logging instrument embodying the present invention suspended in a borehole.

In those forms of the invention chosen for purposes of illustration in the drawing, FIG. 1 shows a typical combination gun perforator and radioactivity well logging instrument 2 suspended in a borehole 4 which penetrates the earth 6 by means of a cable 8. The instrument 2 comprises a perforator portion 10 containing a plurality of perforating guns 12 and a radioactivity well logging portion 14 containing a Geiger counter 16 and suitable electronic circuits 18 for amplifying, shaping and otherwise processing the signal for transmission to the surface. The cable 8 comprises at least one electrical conductor for providing current to supply the well logging portion 14 of the instrument 2 and to actuate the guns 12 of the perforator portion 10 and for transmitting signals from the well logging portion 14 to the surface of the earth where they may be recorded on a suitable recording device 20 as is well known in the art. See Fearon Patent No. 2,309,835.

Figure 2:
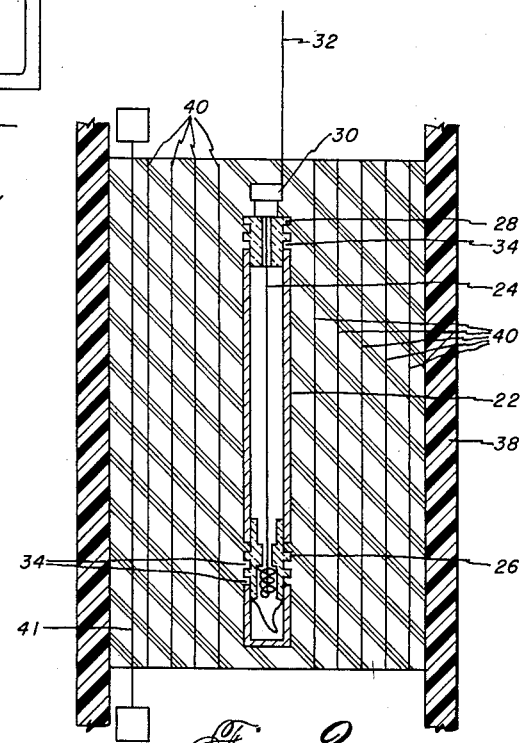
FIG. 2 is an enlarged sectional view showing the portion of the instrument which houses the Geiger counter.

As seen in FIG. 2, the Geiger counter 16 is of conventional construction and comprises a tubular metal cathode 22 and a metal wire anode 24. The anode 24 extends axially of the tubular cathode 22 and is held in place and is electrically insulated from the cathode 22 by ceramic insulators 26 and 28 at opposite ends of the cathode 22. The anode 24 extends completely through insulator 28 and is provided with suitable connecting means 30 for connecting the Geiger counter to appropriate elements of the electronic circuits 18, as by means of a flexible conductor 32. The insulators 26 and 28 are formed with circumferential grooves 34 which provide an increased path for surface leakage from the anode 24 to cathode 22. Unfortunately, however, the grooves 34 also structurally weaken the insulators 26 and 28. Furthermore, the connecting means 30 has appreciable mass and, with conventional Geiger counter mountings, mechanical shock would be applied to the cathode 22 and would accelerate it while inertia would tend to maintain the connecting means 30 stationary. This would produce a shearing moment which would break the insulator 28, resulting in leakage of the counter gas filling and a short circuit between anode 24 and cathode 22, rendering the counter useless.

To prevent such damage, a body 36 of rigid material is cast about the Geiger counter 16 completely surrounding and intimately engaging all parts of the counter 16 and, preferably, filling the space between the counter 16 and the housing 38 of the instrument 2. This body 36 supports the insulators 26 and 28 and serves to distribute mechanical shock over the entire Geiger counter 16 and to other portions of the housing 38, thus causing the entire Geiger counter to be accelerated as a unit. Obviously, the material of which body 36 is formed must have electrically insulating properties comparable with the ceramic insulators 26 and 28. Moreover, since most of the radioactivity well logging performed in conjunction with perforating is gamma ray logging, it is desirable that the material of body 36 have a relatively low density in order to minimize any moderation of the gamma ray flux reaching the counter 16. It has been found that materials, such as epoxy resins, polyethylene, nylon or melamine are particularly well suited to meet these requirements. These materials have the additional advantage that they provide thermal, as well as electrical, insulation for the Geiger counter 16. This is an important advantage, since Geiger counters are somewhat temperature sensitive and, at the high temperatures encountered in some boreholes, the signal from the counter might be misleading unless such thermal insulation is provided. The material must remain rigid at the temperatures encountered. In extreme conditions, where the material must remain rigid at temperature of the order of 400 degrees Fahrenheit, as is the case in some boreholes, the epoxy resins are preferred.

If desired, to provide added strength and rigidity for the body 36, fibers or rods 40 of suitable materials, such as glass wool, may be distributed through the body 36 in the same manner as steel rods are used in reinforced concrete structures. Furthermore, where it is necessary or desirable to provide electrical connections for apparatus located below the body 36, as to provide connections for actuating the guns 12 in the perforator portion 10 of the instrument of FIG. 1, a conductor, such as is shown at 41 in FIG. 2, may be positioned so that the body 36 is cast about the conductor and retains it in a convenient or desired arrangement.

As stated above, the body 36 preferably fills the space between the Geiger counter 16 and adjacent portions of the housing 38. However, if desired, the diameter of body 36 may be made somewhat less than the inside diameter of housing 38 and resilient means may be disposed between the body 36 and the housing 38. However, the body 36 must be sufficiently massive and rigid to prevent differential acceleration of the cathode 22 and anode connector 30 of the counter 16.

Figure 3:
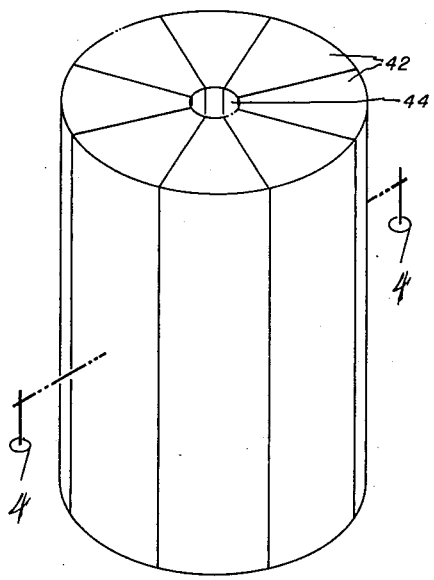
FIG. 3 is a perspective view showing a modified form of the invention for mounting a plurality of Geiger counters in side-by-side relation.
Figure 4:
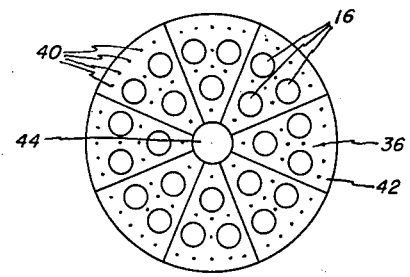
FIG. 4 is a transverse section of the device of FIG. 3 taken on the line 4—4 thereof.

In order to increase sensitivity, it is often desirable to mount a plurality of small diameter Geiger counters in side-by-side relation. This is preferably accomplished in accordance with the present invention, as seen in FIGS. 3 and 4, by distributing the Geiger counters 16 in such a way that the body 36 may be divided into pie-shaped members, as indicated at 42 in FIG. 3, so that a predetermined number of the Geiger counters are encapsulated within each of the members 42. With this arrangement, the members 42 cooperate with each other to form a cylindrical unit having a diameter substantially equal to the inside diameter of the housing 38. However, individual members 42 may be replaced in case of counter failure without requiring replacement of all of the counters. If desired, the members 42 may be formed so that, when assembled as seen in FIG. 3, they form a central opening 44 through which electrical conductors or structural elements may extend.

As indicated above, when the Geiger counters 16 are employed for detecting gamma rays, it is preferable that body 36 be formed of a low density material in order to have a minimum effect on the gamma ray flux reaching the counters 16. On the other hand, it may be desirable in some instances to provide support for Geiger counters which are intended to detect only neutrons or to detect only gamma rays having certain characteristics. This may be readily accomplished by adding a substance, such as cadmium, boron or lead, having appropriate properties to the material of body 36. However, care must be taken to avoid reducing the electrical insulating properties of body 36 to the point that electrical leakage develops between the anode and cathode of the Geiger counters.

It will be apparent that this method and apparatus of the present invention will be equally effective for mounting radiation detectors in other apparatus subjected to great shock or high acceleration, such as in rockets. Moreover, numerous other variations and modifications may also obviously be made without departing from the invention. Accordingly, it should be clearly understood that those forms of the invention described above and shown in the figures of the accompany drawing are illustrative only and are not intended to limit the scope of the invention.

I claim:

1. In a radioactivity well logging instrument having a housing and a shock frangible radiation detector mounted within said housing, the improvement comprising means supporting said detector against damage due to mechanical shock, said means comprising a body of rigid, electrically insulating material enveloping said detector, fully bridging the space between said detector and housing, and immobilizing said detector against movement relative to said housing.

2. Means for supporting a plurality of shock frangible radiation detectors in side-by-side relation in a radioactivity well logging instrument having a housing, said means comprising a plurality of independent, generally pie-shaped members formed of rigid, electrically insulating material, at least one of said detectors being encapsulated within each of said members, said members cooperating with each other to form a circularly cylindrical unit fully occupying the radial space within the housing and immobilizing the detectors against movement relative to said housing and to each other.

3. In a radioactivity well logging instrument having explosive perforating means and a shock frangible radiation detector, the improvement that comprises electrically insulating material enveloping said detector and immobilizing the external parts of said detector against movement relative to one another, said perforating means being spaced axially of said instrument from said detector by such distance that said detector is within the range of the shock wave occasioned upon operation of said perforating means.

4. In a radioactivity well logging instrument having explosive perforating means, a housing and a shock frangible radiation detector mounted within said housing, the improvement that comprises electrically insulating material enveloping said detector, fully bridging the radial space between the detector and housing and immobilizing said detector against movement relative to said housing, said perforating means being spaced axially of said instrument from said detector by such distance that said detector is within the range of the shock wave occasioned upon operation of said perforating means.

References Cited in the file of this patent

UNITED STATES PATENTS

| | | |
|---|---|---|
| 2,309,835 | Fearon | Feb. 2, 1943 |
| 2,486,944 | Hare | Nov. 1, 1949 |
| 2,559,141 | Williams | July 3, 1951 |
| 2,683,766 | Cunningham | July 13, 1954 |
| 2,686,268 | Martin et al. | Aug. 10, 1954 |
| 2,720,617 | Sardella | Oct. 11, 1955 |
| 2,789,242 | Friedman et al. | Apr. 16, 1957 |

OTHER REFERENCES

Application of Some Epoxide Resins in the Plastics Industry, by Narracott, British Plastics, October 1951, pages 341–345.